United States Patent
Yamamoto

(10) Patent No.: US 6,698,913 B2
(45) Date of Patent: Mar. 2, 2004

(54) VEHICLE HEADLAMP

(75) Inventor: Kaoru Yamamoto, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/116,020

(22) Filed: Apr. 3, 2002

(65) Prior Publication Data

US 2002/0145884 A1 Oct. 10, 2002

(30) Foreign Application Priority Data

Apr. 10, 2001 (JP) .................................. P.2001-112033

(51) Int. Cl.[7] .............................. B60Q 1/00; F21V 7/20
(52) U.S. Cl. ...................... 362/548; 362/345; 362/519
(58) Field of Search ............................... 362/294, 296, 362/345, 516, 519, 547, 548

(56) References Cited

U.S. PATENT DOCUMENTS

| | | | | |
|---|---|---|---|---|
| 4,232,360 A | * | 11/1980 | Vakil et al. ................. | 362/294 |
| 4,760,506 A | * | 7/1988 | Mochizuki et al. ......... | 362/548 |
| 5,095,410 A | * | 3/1992 | Nagengast et al. ......... | 362/547 |
| 5,457,616 A | * | 10/1995 | Grigorescu et al. ......... | 362/294 |
| 6,109,773 A | * | 8/2000 | Nace .......................... | 362/548 |
| 6,116,755 A | * | 9/2000 | Ichihara et al. ............. | 362/519 |
| 6,267,489 B1 | | 7/2001 | Yamamoto .................. | 362/519 |
| 6,280,071 B1 | | 8/2001 | Yamamoto et al. ......... | 362/539 |

* cited by examiner

*Primary Examiner*—Alan Cariaso
(74) *Attorney, Agent, or Firm*—Koda & Androlia

(57) ABSTRACT

A vehicle headlamp including a reflector and a light-source bulb installed in the reflector so that the bulb supporting portion of the light-source bulb is slid and fitted on the inner peripheral surface of an annular wall formed in the rear end of the reflector in a cylindrical shape. A plurality of notches are formed through the annular cylindrical wall so as to be positioned in front of the bulb supporting portion of the light-source bulb, thus allowing the heat inside the reflector to escape to the outside through the notches and avoiding the reflector from being heated to a high temperature.

4 Claims, 7 Drawing Sheets

VEHICLE HEADLAMP

BACKGROUND OF THE INVENTION

1. Field of the Invention

The present invention relates to a vehicle headlamp, and more particularly, to a structure of the portion of a vehicle headlamp where a light-source bulb is fixed to a reflector.

2. Prior Art

In a vehicle headlamp, a light-source bulb is generally fixed to a reflector by a bulb fixing member as shown in FIG. 7.

In this vehicle headlamp, a light-source bulb 2 has a flange portion 2d formed on the peripheral surface of a bulb supporting portion 2c that supports a bulb body 2b. A reflector 4 has a bulb insertion hole 4b in the reflector body 4A so that the bulb insertion hole 4b receives the bulb body 2b of the light-source bulb 2. The reflector 4 has also an annular wall 4B in the reflector body 4A. The annular wall 4B protrudes rearward from the periphery of the bulb insertion hole 4b.

The bulb supporting portion 2c of the light-source bulb 2 is slid and fitted on the inner peripheral surface of the annular wall 4B of the reflector 4 so that the flange portion 2d abuts on the rear end face of the annular wall 4B. Then, a bulb fixing member 6 is fitted on the rear end of the annular wall 4B so that the front and rear sides of the flange portion 2d of the bulb 2 are sandwiched and held between the annular wall 4B and the bulb fixing member 6. The light-source bulb 2 is thus fixed to the reflector 4.

However, such a lamp fixture that has the bulb supporting portion 2c which is slid and fitted on the inner peripheral surface of the annular wall 4B of the reflector 4 has problems. The bulb supporting portion 2c of the light-source bulb 2 completely closes the bulb insertion hole 4b of the reflector 4. Therefore, the heat, which is radiated together with light from the filament 2a of the light-source bulb 2 when the light-source bulb 2 is turned-on, is confined inside the inner space of the reflector 4.

This causes the temperature rise in the reflector 4. When the reflector 4 is made of resins, a thermal deformation can easily occur in the reflector 4.

Generally, a structure in which the bulb supporting portion 2c of the light-source bulb 2 is slid and fitted on the inner peripheral surface of the annular wall 4B of the reflector 4 is often employed when the bulb supporting portion 2c of the light-source bulb 2 is molded with resins. In such a case, however, a thermal deformation can easily occur in the bulb supporting portion 2c or in the O-ring 8 mounted on the bulb supporting portion 2c for use in the sliding and fitting operation.

SUMMARY OF THE INVENTION

Accordingly, the present invention is to solve the above problems with the prior art lamp structure.

It is an object of the present invention to provide a vehicle headlamp capable of preventing a temperature rise in a reflector and thus reducing the thermal deformation of the reflector, etc.

The present invention accomplishes the above object by improving the structure of the annular wall of a reflector.

More specifically, the above object is accomplished by a unique structure of the present invention for a vehicle headlamp that includes:

a light-source bulb, a reflector for reflecting light from the light-source bulb in a forward direction, and a bulb fixing member for fixing the light-source bulb to the reflector; wherein the light-source bulb is comprised of a bulb body, a bulb supporting portion for supporting the bulb body, and a flange portion formed on the peripheral surface of the bulb supporting portion, the reflector includes a reflector body having a bulb insertion hole for inserting the bulb body therein and an annular wall protruding rearward from the periphery of the bulb insertion hole of the reflector body, and the light-source bulb is fixed to the reflector by sliding and fitting the bulb supporting portion of the light-source bulb on an inner peripheral surface of the annular wall so that the flange portion abuts on the rear end of the annular wall, and then holding the front and rear sides of the flange portion by the annular wall and the bulb fixing member; and in the present invention:

the annular wall is provided with at least one notch hole that extends through the annular wall, and such a notch hole is located at a position ahead of where the bulb supporting portion is fitted in the annular wall.

In this headlamp of the present invention, the "bulb fixing member" is not specifically limited in terms of the structure as long as the bulb fixing member serves to fix the light-source bulb to the reflector by holding, together with the annular wall, both front and rear sides of the flange portion of the light-source bulb.

Also, it should be noted that a part of the "bulb supporting portion" of the bulb that is slid and fitted on the inner peripheral surface of the annular wall of the reflector may be the outer peripheral surface of the bulb supporting portion itself. However, that part of the bulb supporting portion may be another member such as an O-ring mounted on the bulb supporting portion.

Furthermore, the "notch hole" is not specifically limited in terms of the structure including shape, size, position and number as long as it extends through the annular wall of the reflector and is formed at a position located ahead (or on the front side) of the position where the bulb supporting portion is fitted in the annular wall.

The present invention is for a vehicle headlamp of the type in which the light-source bulb is fixed to a reflector in such a manner that the bulb supporting portion of the light-source bulb is slid and fitted on the inner peripheral surface of the annular wall of the reflector, thus letting the flange portion abut on the rear end face of the annular wall; and then both front and rear sides of the flange portion are sandwiched by the end surface of the annular wall and the bulb fixing member. However, in this type of lamp fixtures, the bulb supporting portion of the light-source bulb completely closes the bulb insertion hole of the reflector. As a result, the heat radiated from the light-source bulb is confined within the inner space of the reflector.

In the vehicle headlamp of the present embodiment, however, at least one notch hole that extends through the annular wall is formed so as to be located ahead (or on the front side) of the position where the bulb supporting portion of the light-source bulb is fitted in the annular wall. Thus, the notch hole allows the inner space of the reflector to communicate with the outer space of the reflector, so that the heat in the inner space of the reflector is dissipated to the outside of the reflector through the notch hole.

Accordingly, in the headlamp of the present invention, the reflector is prevented from being heated to a high temperature. Even when the reflector is made of a resin material, it is less susceptible to a thermal deformation. Moreover, even when the bulb supporting portion of the light-source bulb is made of resins, the element such as the bulb supporting portion, the O-ring mounted thereto for the sliding and fitting operation are prevented from a thermal deformation.

In the above structure, one notch hole may be formed so as to positioned above the light-source bulb. This allows the heat generated in the inner space of the reflector to be more efficiently dissipated into the outer space through that notch hole.

In the above structure, screwing portions for screwing the bulb fixing member to the annular wall may be formed at a plurality of circumferential positions in the rear end face of the annular wall. When the reflector has such screwing portions, it is preferable that each of the notch holes be provided ahead of each screwing portion; and this structure provides several advantages as described below.

The screwing portions of the annular wall must be formed with a boss-like shape; and this requires the annular wall to have a large thickness. If such thick screwing portions of the annular wall are formed so as extend to the reflector body, then the reflecting surface of the reflector formed as a resin molded member would have a large shrinkage cavity; and this would adversely affect the light distribution capability of the lamp fixture.

However, in the present invention, the notch holes are respectively provided in front of the screwing portions; and thus, the thick screwing portions of the annular wall do not extend to the reflector body. Accordingly, a large shrinkage cavity is prevented in the reflecting surface of the reflector.

In a lamp fixture that has a reflector housed in a lamp body, the lamp body often has an opening near the rear end of the reflector, which is larger than the outer diameter of the annular wall, and a cover member is often attached to the lamp body so as to close the opening.

In such a lamp fixture, a cover member provided with a reflector fitting hole that has a diameter approximately equal to the outer diameter of the annular wall is used, so that the reflector fitting hole is fitted on the outer peripheral surface of the annular wall of the reflector at a position behind the notch holes. With this structure, the cover member can seal the notch holes from the outer space of the lamp body, thus assuring waterproof and dustproof properties of the lamp fixture unit. In addition, the light-source bulb can be replaced without detaching the cover member from the lamp body.

DETAILED DESCRIPTION OF THE INVENTION

Hereinafter, preferred embodiments of the present invention will be described in conjunction with the accompanying drawings.

Figure 1:
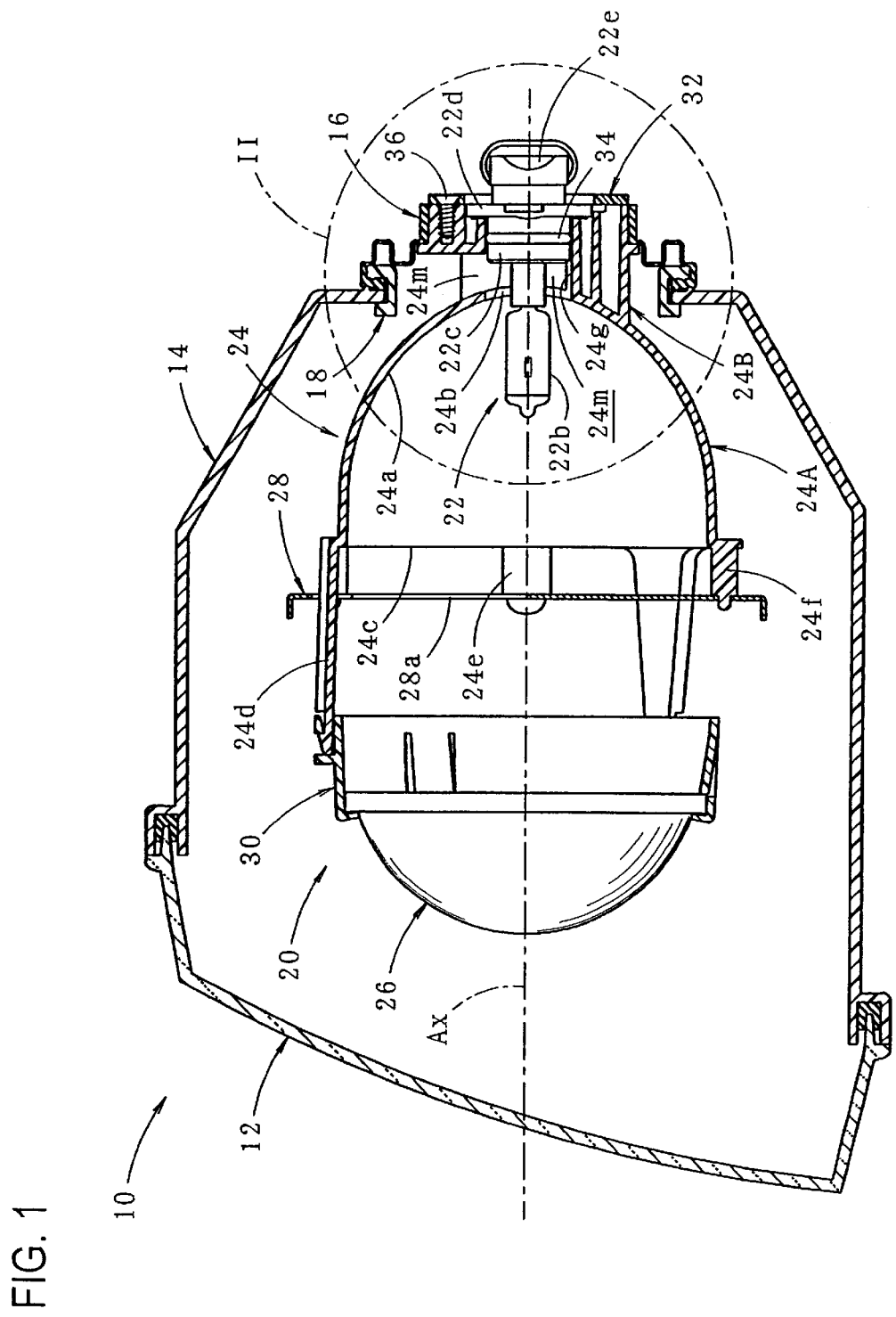
FIG. 1 shows the sectional side elevation of a vehicle headlamp according to one embodiment of the present invention.

As seen from FIG. 1, the vehicle headlamp 10 of the shown embodiment includes a lamp fixture unit 20 housed in a lamp chamber defined by a plain transparent cover 12 and a lamp body 14. The lamp fixture unit 20 is tiltable in the vertical and lateral directions by an aiming mechanism (not shown).

Figure 2:
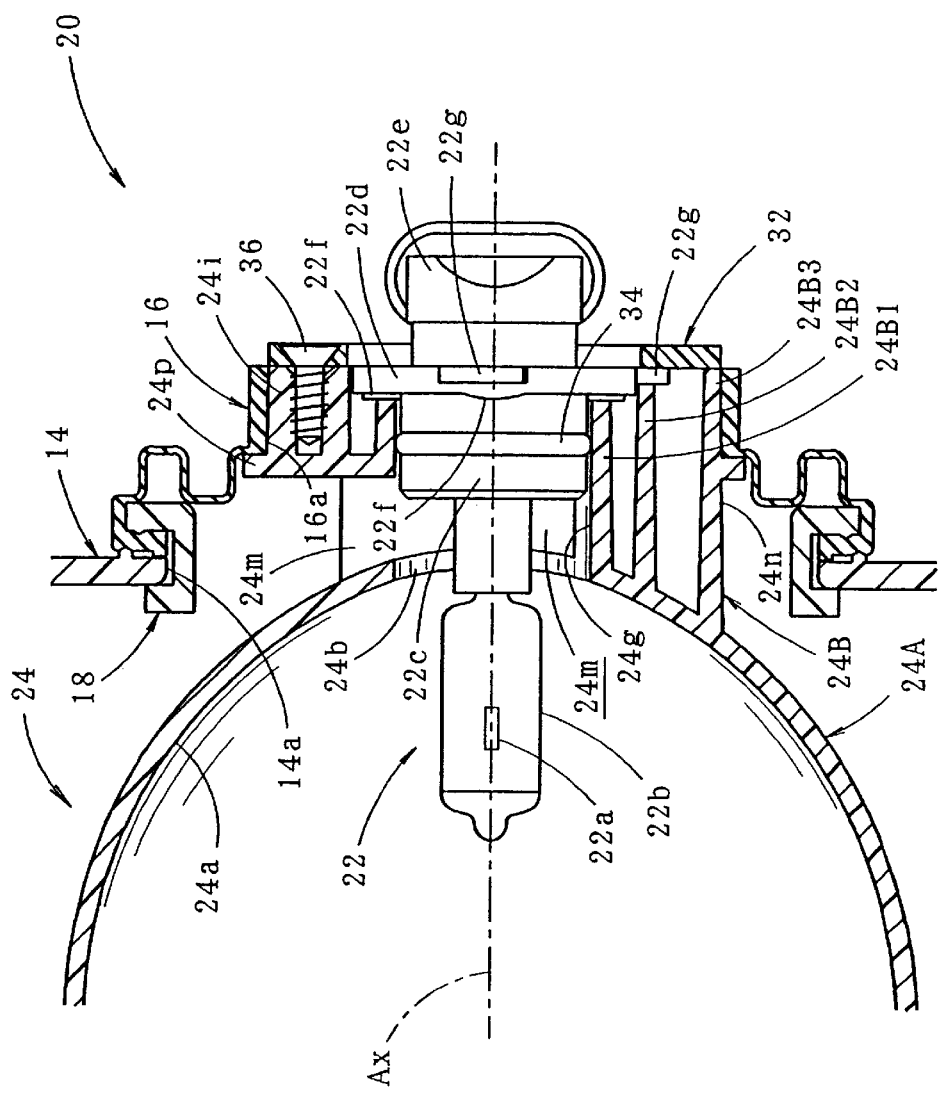
FIG. 2 specifically shows the encircled portion 11 in FIG. 1.
Figure 3:
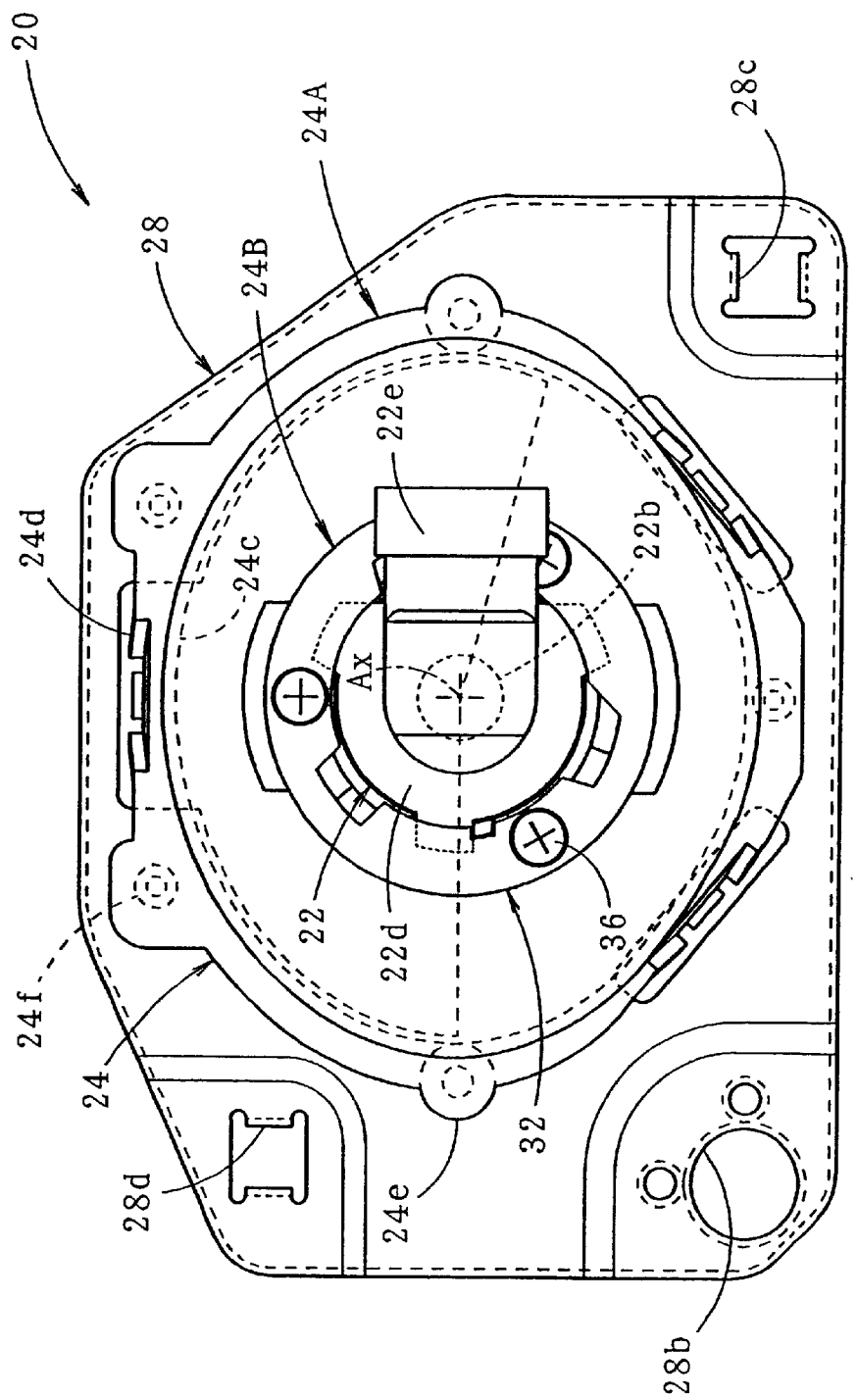
FIG. 3 shows the back of the lamp fixture unit of the vehicle headlamp alone.
Figure 4:
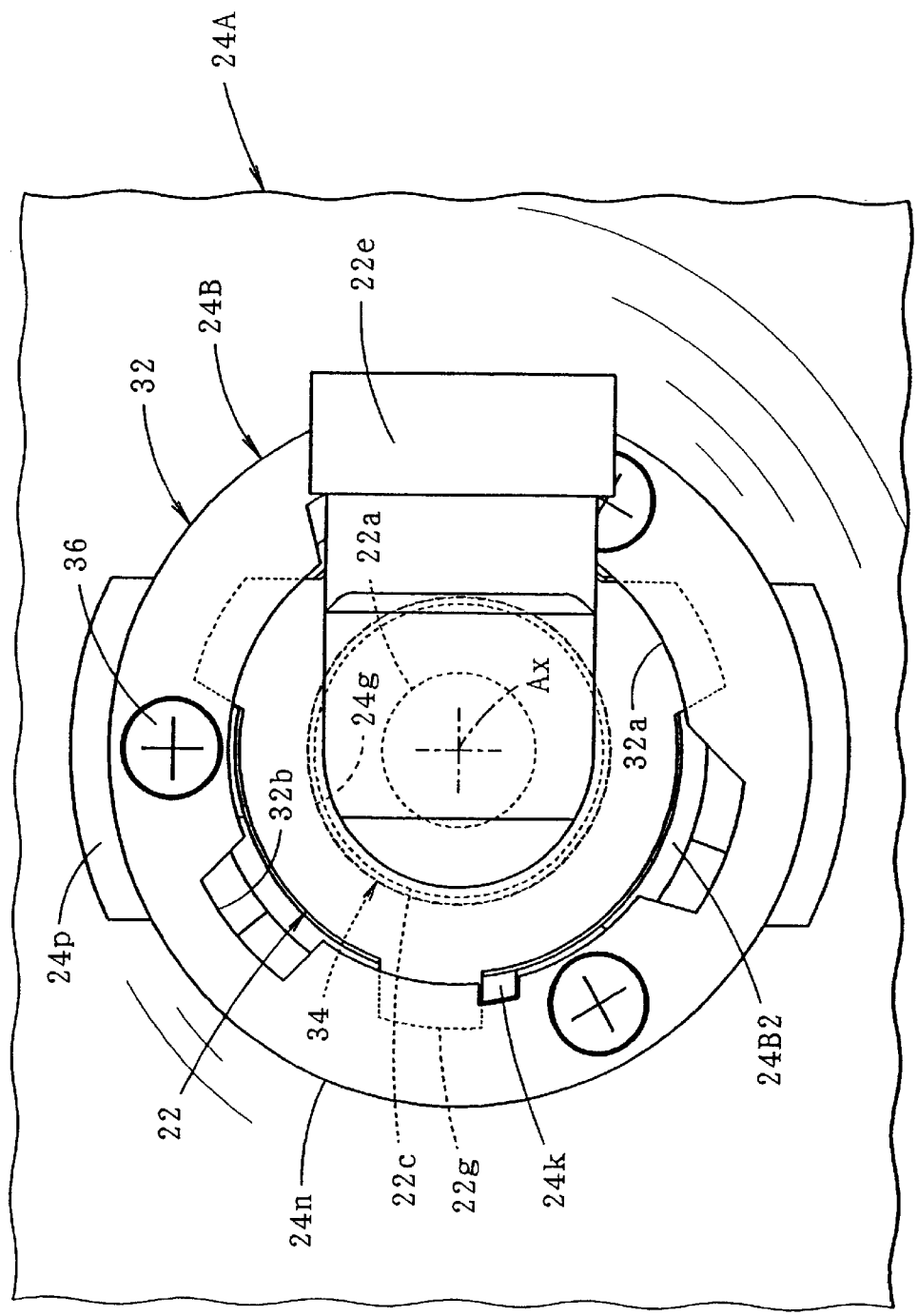
FIG. 4 shows the main portion of the lamp fixture unit of FIG. 3.

The lamp fixture unit 20 is a so-called projector-type lamp fixture unit; and as seen from FIGS. 1, 2 and 3, it includes a light-source bulb 22, a reflector 24, a projection lens 26, a shade 28, a lens holder 30 and a bulb fixing member 32.

The light-source bulb 22 is a HB4-type halogen bulb in this embodiment. In other words, the light-source bulb 22 is comprised of a bulb body 22b having a single filament as a light source 22a, a bulb supporting portion 22c for supporting the bulb body 22b, a flange portion 22d formed on the peripheral surface of the bulb supporting portion 22c, and a connector portion 22e formed at the rear end of the bulb supporting portion 22c. This light-source bulb 22 is fixed to the rear end of the reflector 24 by the bulb fixing member 32 so that the light source 22a is coaxial with an optical axis Ax of the lamp fixture. The bulb supporting portion 22c, flange portion 22d and connector portion 22e of the light-source bulb 22 are formed as an integral resin molded member. An O-ring 34 is mounted on the bulb supporting portion 22c at a position located ahead of (or on the front side of) the flange portion 22d.

The reflector 24 is a resin molded member and includes a reflector body 24A and an annular wall 24B.

More specifically, the reflector body 24A has a reflecting surface 24a having an approximately elliptical-spherical shape centered about the optical axis Ax of the lamp fixture. The reflecting surface 24a has an elliptical shape in cross section that includes the optical axis Ax of the lamp fixture, and it has an eccentricity that gradually increases from its vertical section toward the horizontal section. The rear vertex of the ellipse of each of the cross sections of the reflecting surface 24a is located at the same position.

The light source 22a is positioned at a first focal point of the ellipse of the vertical section of the reflecting surface 24a. This allows the reflecting surface 24a to reflect light from the light source 22a in the forward direction and toward the optical axis Ax of the lamp fixture.

The reflector body 24A is formed with a bulb insertion hole 24b at its rear end so that the bulb body 22b of the light-source bulb 22 is inserted therein. The annular wall 24B projects rearward from the periphery of the bulb insertion hole 24b of the reflector body 24A. An inner peripheral surface 24g of the annular wall 24B has the same diameter as that of the bulb insertion hole 24b and extends rearward.

Three lens holder fixing arms 24d, two shade fixing bosses 24e, and three shade positioning support pins 24f project forward from a front-end opening 24c of the reflector body 24.

The projection lens 26 is mounted to the lens holder 30 at a position located ahead of (or on the front side of) the reflector 24 as best seen from FIG. 1. The lens holder 30 is a ring-shaped resin member, and its inner diameter is substantially the same as the outer diameter of the projection lens 26. The lens holder 30 is fixedly supported at the front ends of the lens holder fixing arms 24d of the reflector 24 by lance engagement.

The shade 28 is a press molded member of a steel plate, and it is fixedly supported to the reflector 24 at a position near the focal point of the projection lens 26. The shade 28 has a light-transmitting opening 28a so that the lower region of the front-end opening 24c of the reflector 24 is covered with the shade 28 in a fan shape. The shade 28 thus partially shields the reflected light from the reflecting surface 24a, thus removing the upward radiated light from the lamp fixture unit 20. As a result, the beams are radiated with a low-beam light-distribution pattern.

The shade 28 is fixedly supported to the reflector 24 by screwing at the two shade fixing bosses 24e. Three shade positioning support pins 24f make the positioning of the shade 28 relative to the reflector 24.

The shade 28 also functions as an aiming bracket to which an aiming member (not shown) that tilts the reflector 24 is mounted. In other words, the size of the shade 28 is quite larger than that of the front-end opening 24c of the reflector 24. Also, the shade 28 has a fulcrum hole 28b formed in one of its lower corners for mounting an aiming fulcrum member (not shown) therein, a working point hole 28c formed in the other lower corner for mounting therein a nut screwed onto a laterally tilting aiming screw (not shown), and another working point hole 28d formed in its upper corner located above the fulcrum hole 28b for mounting therein a nut screwed onto a vertically tilting aiming screw (not shown).

As shown in FIGS. 3 through 6 as well, the annular wall 24B is a triple wall structure. Thus, the respective end faces of an inner peripheral wall 24B1, an intermediate wall 24B2 and an outer peripheral wall 24B3 are displaced rearward in this order.

Figure 5:
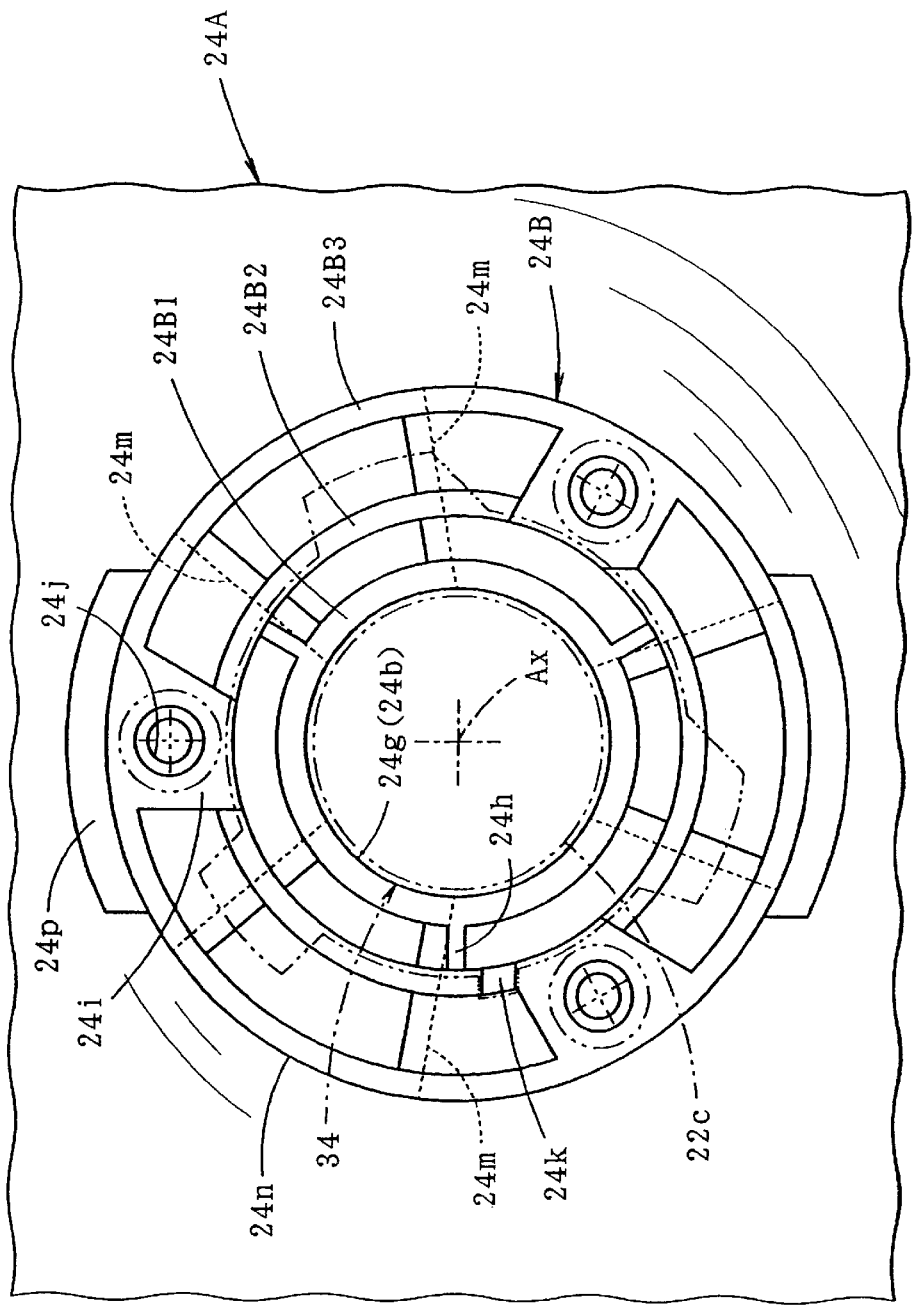
FIG. 5 is a detailed rear view of the rear end portion of the reflector of the lamp fixture unit.
Figure 6:
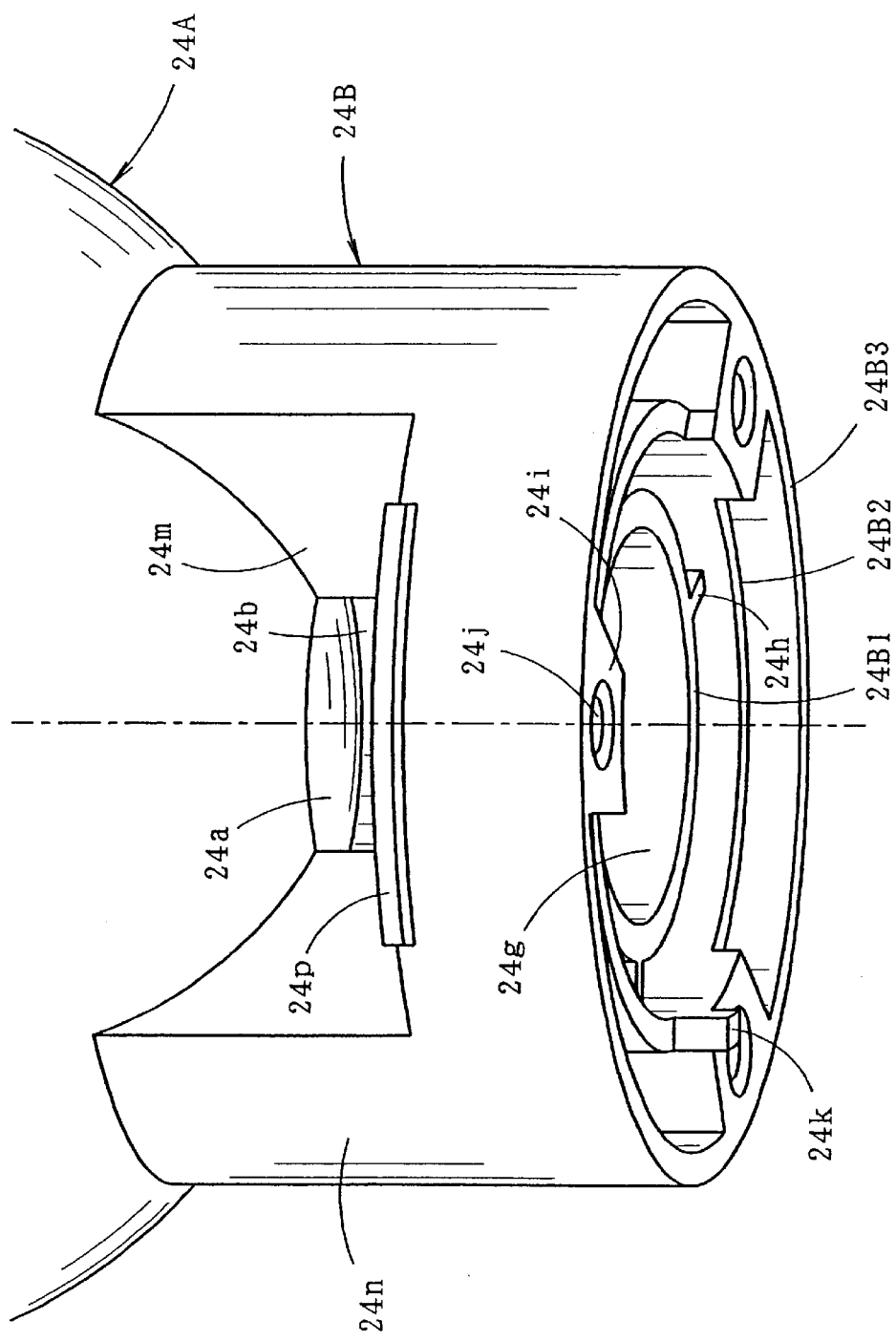
FIG. 6 shows the rear end portion of the reflector viewed obliquely from above.
Figure 7:
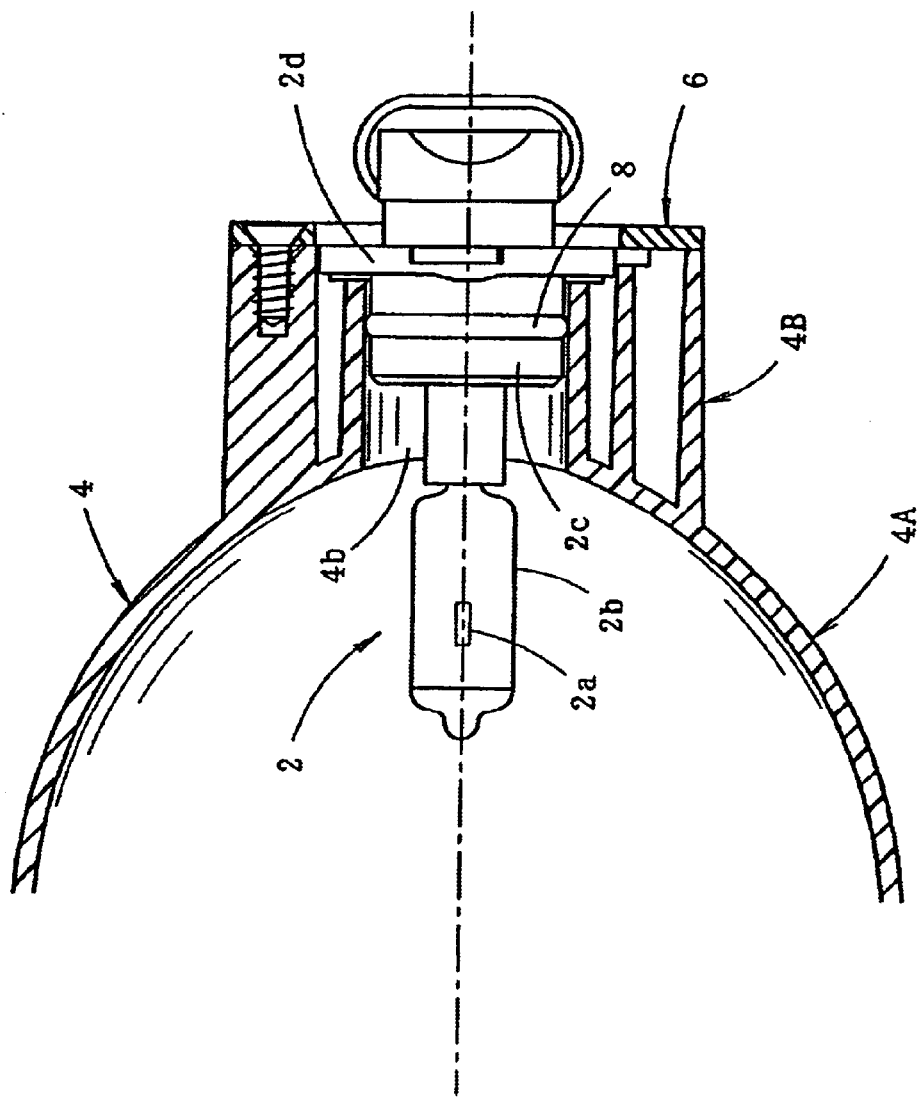
FIG. 7 shows the prior art reflector with a light-source bulb installed.

As best seen from FIG. 5, the inner peripheral wall 24B1 is connected to the intermediate wall 24B2 by ribs 24h formed at three circumferential positions. The intermediate wall 24B2 is connected to the outer peripheral wall 24B3 by screwing portions 24i formed at three circumferential positions. The screwing portions 24i are formed at intervals of 120° so that one of them is located above the optical axis Ax of the lamp fixture. Each screwing portion 24i has a tapped hole 24j.

The light-source bulb 22 is fixed to the reflector 24 in the following manner: the O-ring 34 mounted on the bulb supporting portion 22c of the light-source bulb 22 is slid and fitted on the inner peripheral surface 24g of the annular wall 24B (more specifically, the inner peripheral wall 24B1) of the reflector 24 so that the flange portion 22d abuts on the rear end face of the annular wall 24B (or the inner peripheral wall 24B1). Thus keeping the flange portion 22d, the bulb fixing member 32 is fitted on the rear end of the annular wall 24B, so that the front and rear sides of the flange portion 22d are sandwiched and held by the annular wall 24B (or the inner peripheral wall 24B1) and the bulb fixing member 32.

The flange portion 22d of the light-source bulb 22 has three positioning projections 22f. The positioning projections 22f are respectively formed on the front surface of the flange portion 22d at three circumferential positions located somewhat inward from the outer peripheral edge of the flange portion 22d. The flange portion 22d further has three wings 22g that are respectively formed on its outer peripheral end face at three circumferential positions. The flange portion 22d abuts on the rear end face of the inner peripheral wall 24B1 of the annular wall 24B at each positioning projection 22f, and it also abuts on the bulb fixing member 32 at each wing 22g.

The bulb fixing member 32 is a substantially annular plate having the same outer diameter as that of the annular wall 24B (the outer peripheral wall 24B3). The bulb fixing member 32 is fixed to the screwing portions 24i of the annular wall 24B by screws 36 at three circumferential positions. The bulb fixing member 32 is formed with notches 32b formed at three circumferential positions in its inner peripheral surface 32a. The notches 32b are somewhat larger than the wings 22g of the flange portion 22d.

When attaching the light-source bulb 22 to the reflector 14, with the bulb fixing member 32 being fixedly screwed to the annular wall 24B in advance, the light-source bulb 22 is inserted into the annular wall 24B with the wings 22g of the flange portion 22d being aligned with the respective notches 32b of the bulb fixing member 32. Then, the light-source bulb 22 is rotated (for instance, counterclockwise) by a prescribed angle.

The annular wall 24B is provided with a stopper pin 24k at the rear end face of its intermediate wall 24B2. As the light-bulb source 12 is rotated, the stopper pin 24k abuts on the wing 22g, thus positioning the light-source bulb 22 in the rotating direction.

As best seen from FIG. 5, three notch holes 24m radially extending through the annular wall 24B (inner peripheral wall 24B1, intermediate wall 24B2 and outer peripheral wall 24B3) are formed so that such notch holes 24m are located ahead of (or on the front side of) the position where the bulb supporting portion 22c of the bulb 22 is fitted in the annular wall 24B (i.e., the position of the O-ring 34). One of three notch holes 24m is located above the optical axis Ax of the lamp fixture (see FIG. 6), and the other two notch holes are respectively located at lower right and lower left sides of the optical axis Ax.

Each notch hole 24m has a fan shape (or letter V) in cross section perpendicular to the optical axis Ax, the fan shape spreading out in the radial direction. The cross section of the front end of each notch hole 24m including the optical axis Ax is, as seen from FIG. 6, curved along the rear surface of the reflector body 24A, and the cross section of the rear end of each notch hole 24m extends straight in the direction perpendicular to the optical axis Ax.

Ribs 24p are formed at upper and lower portions of an outer peripheral surface 24n of the annular wall 24B (the outer peripheral wall 24B3) so as to extend in the circumferential direction by a prescribed angle. Each rib 24p is located right behind the notch holes 24m.

As shown in FIG. 2, the lamp body 14 has an opening 14a at a position near the rear end of the reflector 24. The opening 14a is larger than the outer diameter of the annular wall 24B of the reflector 24. A cover member 16 is attached to the lamp body 14 by a cover fixing member 18 so that the cover member 16 closes the opening 14a of the lamp body 14. The cover member 16 is formed with a reflector fitting hole 16a that has a diameter approximately the same as the outer diameter of the annular wall 24B (the outer peripheral wall 24B3).

The reflector fitting hole 16a of the cover member 16 is fitted on the outer peripheral surface 24n of the annular wall 24B of the reflector 24 at a position behind the notch holes 24m. The pair of upper and lower ribs 24p of the annular wall 24B serves as a stopper upon fitting the cover member 16 on the annular wall 24B.

In the above-described lamp fixture unit 20 of the vehicle headlamp 10, the bulb supporting portion 22c of the light-source bulb 22 is slid and fitted on the inner peripheral surface of the annular wall 24B of the reflector 24 so that the flange portion 22d abuts on the rear end face of the annular wall 24B; then, both front and rear sides of the flange portion 22d are held by the end face of the annular wall 24B and the bulb fixing member 32. The lamp fixture unit 20 is thus installed in the vehicle headlamp 10. In general, in this type of lamp fixture unit, the bulb supporting portion 22c of the light-source bulb 22 completely closes the bulb insertion hole 24b of the reflector 24. As a result, the heat radiated from the light-source bulb 22 is likely to be confined within the inner space of the reflector 24.

However, in the lamp fixture unit 20 of the present invention, three notch holes 24m extending through the annular wall 24B are formed in the reflector 24 so that they are positioned ahead of (or on the front side of) the position where the bulb supporting portion 22c of the light-source bulb 22 is fitted in the annular wall 24B. These notch holes 24m allow the inner space of the reflector 24 to communicate with the outer space; and as a result, the heat in the inner space of the reflector 24 is dissipated into the outer space through the notch holes 24m.

Accordingly, the reflector 24 is not heated to a high temperature. Though the reflector 24 is made of resins, the reflector 24 is less susceptible to a thermal deformation. Moreover, though the bulb supporting portion 22c of the light-source bulb 22 is a resin molded member, the bulb supporting portion 22c or the O-ring 34 mounted thereon for the sliding and fitting operation is less susceptible to a thermal deformation.

When the lamp fixture unit 20 is a projector-type lamp fixture unit as in the vehicle headlamp 10 of the shown embodiment, the reflector 24 has a small inner space and the heat is likely to be confined therein. Accordingly, the use of the structure of the present invention is particularly effective for projector-type lamp fixtures.

In the shown embodiment, one of three notch holes 24m is provided above the light-source bulb 22. This allows the heat in the inner space of the reflector 24 to escape to the outside of the reflector through the notch hole 24m more efficiently.

In the shown embodiment, the screwing portions 24i for fixedly screwing the bulb fixing member 32 to the annular wall 24B are respectively formed at three circumferential positions in the rear end face of the annular wall 24B. Since the notch holes 24m are positioned ahead of (or on the front side of) the screwing portions 24i, the effects described below can be obtained.

The screwing portions 24i of the annular wall 24B must be formed with a boss-like shape; and as a result, the annular wall 24B has a large thickness. If such thick screwing portions 24i of the annular wall 24B extend to the reflector body 24A, the reflecting surface 24a of the reflector 24 formed as a resin molded member would have a large shrinkage cavity, thereby adversely affecting the light distribution capability of the lamp fixture.

However, in the shown embodiment, three notch holes 24m are formed in front of the screwing portions 24i. Accordingly, the thick screwing portions 24i of the annular wall 24B do not extend to the reflector body 24A, and a large shrinkage cavity is prevented from occurring in the reflecting surface 24a of the reflector 24.

In the vehicle headlamp 10 of the shown embodiment, the lamp fixture unit 20 is accommodated in the lamp chamber defined by the transparent cover 12 and the lamp body 14; and the lamp body 14 is provided with an opening 14a near the rear end of the reflector 24 with the opening 14a having a diameter larger than the outer diameter of the annular wall 24B. Thus, the cover member 16 is attached to the lamp body 14 so as to close the opening 14a.

In this structure, the cover member 16 has the reflector fitting hole 16a that has a diameter approximately the same as the outer diameter of the annular wall 24B. The reflector fitting hole 16a is fitted on the outer peripheral surface 24n of the annular wall 24B at a position behind the notch holes 24m. The cover member 16 thus seals the notch holes 25m from the outer space of the lamp body 14. This assures waterproof and dustproof properties of the lamp fixture unit 20, and it also allows the light-source bulb 22 to be replaced without detaching the cover member 16 from the lamp body 14.

The above embodiment is described with reference to the lamp fixture unit 20 that is a projector-type lamp fixture unit. However, the present invention is applicable to other types of lamp fixture units such as a so-called parabolic lamp fixture unit, and such a parabolic lamp fixture unit also provides the same advantages as that of the described embodiment.

What is claimed is:

1. A vehicle headlamp, comprising:
   a light-source bulb,
   a reflector for reflecting light from said light-source bulb in a forward direction, and
   a bulb fixing member for fixing said light-source bulb to said reflector; wherein
   said light-source bulb includes a bulb body, a bulb supporting portion for supporting said bulb body, and a flange portion formed on a peripheral surface of said bulb supporting portion,
   said reflector includes a reflector body having a bulb insertion hole for inserting said bulb body therein and an annular wall protruding rearward from a periphery of said bulb insertion hole of said reflector body, and
   said light-source bulb is fixed to said reflector by sliding and fitting said bulb supporting portion on an inner peripheral surface of said annular wall so that said flange portion abuts on a rear end face of said annular wall and allowing front and rear sides of said flange portion to be held between said annular wall and said bulb fixing member,
   said annular wall is provided with at least one notch hole that extends through said annular wall at a position ahead of where said bulb supporting portion of said light-source bulb is fitted in said annular wall,
   said reflector is housed in a lamp body having an opening near a rear end of said reflector, said opening being larger than an outer diameter of said annular wall of said reflector,
   a cover member having a reflector fitting hole is attached to said lamp body so as to close said opening of said lamp body, said reflector fitting hole having a diameter substantially equal to said outer diameter of said annular wall,
   said reflector fitting hole of said cover member is fitted on an outer peripheral surface of said annular wall at a position behind said at least one notch hole, and
   whereby said light-source is replaceable without detaching the cover member from said lamp body.

2. The vehicle headlamp according to claim 1, wherein said at least one notch hole is provided so as to be positioned above said light-source bulb.

3. The vehicle headlamp according to claim 1, wherein said annular wall is provided with screwing portions for fixedly screwing said bulb fixing member to said annular wall, said screwing portions being respectively formed at a plurality of circumferential positions about said rear end face of said annular wall, and said at least one notch hole is provided at a position ahead of each of said screwing portions.

4. The vehicle headlamp according to claim 2, wherein said annular wall is provided with screwing portions for fixedly screwing said bulb fixing member to said annular wall, said screwing portions being respectively formed at a plurality of circumferential positions about said rear end face of said annular wall, and said at least one notch hole is provided at a position ahead of each of said screwing portions.

* * * * *